(12) United States Patent
Wang

(10) Patent No.: US 8,009,551 B2
(45) Date of Patent: Aug. 30, 2011

(54) INITIAL PILOT FREQUENCY SELECTION

(75) Inventor: Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1049 days.

(21) Appl. No.: 11/021,051

(22) Filed: Dec. 22, 2004

(65) Prior Publication Data
US 2006/0133381 A1    Jun. 22, 2006

(51) Int. Cl.
*H04J 11/00*    (2006.01)
(52) U.S. Cl. ........................................ 370/208
(58) Field of Classification Search .................. 370/208, 370/340, 341, 342, 343, 348, 478, 203, 441, 370/510; 375/340, 132, 135, 260
See application file for complete search history.

(56) References Cited

U.S. PATENT DOCUMENTS

| | | | |
|---|---|---|---|
| 5,867,478 A * | 2/1999 | Baum et al. .................. | 370/203 |
| 6,256,508 B1 * | 7/2001 | Nakagawa et al. ........... | 370/312 |
| 6,424,678 B1 * | 7/2002 | Doberstein et al. ........... | 375/260 |
| 6,490,161 B1 | 12/2002 | Johnson | |
| 6,490,262 B1 | 12/2002 | Hogger | |
| 6,680,727 B2 | 1/2004 | Butler et al. | |
| 6,961,364 B1 * | 11/2005 | Laroia et al. .................. | 375/132 |
| 7,397,838 B2 * | 7/2008 | Laroia et al. .................. | 375/132 |
| 2002/0041635 A1 | 4/2002 | Ma et al. | |
| 2002/0122381 A1 | 9/2002 | Wu et al. | |
| 2003/0198281 A1 | 10/2003 | Grier et al. | |
| 2004/0141570 A1 * | 7/2004 | Yamazaki et al. ............ | 375/340 |
| 2004/0213365 A1 | 10/2004 | Murakami et al. | |
| 2004/0233838 A1 | 11/2004 | Sudo et al. | |
| 2005/0094597 A1 * | 5/2005 | Hwang et al. ................. | 370/329 |
| 2006/0002452 A1 * | 1/2006 | Laroia et al. .................. | 375/135 |
| 2006/0062238 A1 | 3/2006 | Mahendran et al. | |
| 2006/0136790 A1 | 6/2006 | Julian et al. | |
| 2006/0153239 A1 | 7/2006 | Julian et al. | |
| 2007/0133386 A1 * | 6/2007 | Kim et al. ..................... | 370/203 |

FOREIGN PATENT DOCUMENTS

| | | |
|---|---|---|
| CL | 3358-2005 | 12/2005 |
| CL | 3359-2005 | 12/2005 |
| CL | 3361-2005 | 12/2005 |
| CL | 3362-2005 | 12/2005 |
| EP | 1148674 A2 * | 10/2001 |

(Continued)

OTHER PUBLICATIONS

International Search Report—PCT/US05/046802, International Search Authority—European Patent Office, May 16, 2006.
Written Opinion—PCT/US05/046802, International Search Authority—European Patent Office, May 16, 2006.

(Continued)

*Primary Examiner* — Aung S Moe
*Assistant Examiner* — Awet Haile
(74) *Attorney, Agent, or Firm* — Stanton C. Braden

(57) ABSTRACT

The subject invention selects a starting sub-carrier frequency group for a pilot staggering sequence to facilitate in mitigating the possibility of pilot signal collisions. In one embodiment, a randomized starting sub-carrier frequency group of the pilot is utilized in a first orthogonal frequency division multiplexing (OFDM) symbol of a frame. In another embodiment, a starting pilot sub-carrier frequency group number is determined by utilizing a random number generator such as, for example, a Pseudo-Noise (PN) sequence generator, seeded by a network identification (ID) number. In this manner, the starting sub-carrier frequency group is specific to that particular network. The subject invention also provides a more scalable system through the trading of system bandwidth for coverage.

31 Claims, 11 Drawing Sheets

FOREIGN PATENT DOCUMENTS

| | | |
|---|---|---|
| EP | 1 583 268 A1 | 10/2005 |
| JP | 2000068975 | 3/2000 |
| KR | 1020030040547 | 5/2003 |
| WO | WO 2004/068757 A1 | 8/2004 |
| WO | WO2004077730 | 9/2004 |
| WO | WO2004095791 | 11/2004 |
| WO | WO 2005/114940 A1 | 12/2005 |

OTHER PUBLICATIONS

International Preliminary Report on Patentability—PCT/US05/046802, The International Bureau of WIPO—Geneva, Switzerland, Jun. 26, 2007.

European Search Report—EP10180564, Search Authority—The Hague Patent Office, Oct. 28, 2010 (040793).

\* cited by examiner

INITIAL PILOT FREQUENCY SELECTION

BACKGROUND

I. Field

The subject invention relates generally to data communications, and more particularly to systems and methods for selecting an initial pilot frequency for a wireless communication system.

II. Background

Communicating has always been of paramount importance to humankind. Long before the advent of modern technologies, sound waves were utilized to convey information with the human voice. However, this type of communication was severely limited by the power of the human lungs. To overcome this problem, sound wave producing devices were used in place of the human voice, such as drums, to increase communication distances. However, when distances between parties were too great for the sound waves to be interpreted by the human ear, communication was lost. Thus, great strides were made to overcome this limitation through advances in technology. In one solution, sound waves were converted to electricity which was, in turn, transmitted through wires to a final destination where the electricity was then converted back into sound waves. The telephone is one such example of this technology.

Despite the fact that this solution greatly increased communication distances, it also introduced an additional associated problem, namely the requirement of wiring to transport the electrical signals between communication points. The wiring is often costly and requires great quantities to cover immense distances and to handle increased user numbers. Technology attempted to resolve some of the issues through the development of fiber optic cable which can carry light impulses instead of electrical currents. This drastically reduces the number of wires required to transport the same amount of communications. However, fiber optics come with an increased price and substantially increased costs for repairs and skill levels to maintain a fiber optic network.

Although one first thinks of 'communicating' being a human type of interaction, the dawning of the computer age also brought with it the necessity to link computers together. Thus, communication networks are not only required to carry the human voice, but also information that consists of digitized data (data converted to ones and zeros). In fact, some technologies even digitize the human voice to more efficiently transport it over great distances. This demand has greatly increased the workload of typical communication networks and driven a substantial increase in the number of wires or cables.

One seemingly obvious way to overcome the problem of vast, wired communication networks is to do away with the wires and utilize a "wireless" communication system. Although the solution seems easy enough, developing wireless communications is typically a complex issue. Early wireless communication techniques, such as the radio, enabled remote areas to receive broadcasts from distant places. This "one-way" type of communicating is a great means to disseminate information such as announcements and news. However, it is frequently desirable to have two-way communications or even greater than two-way communications. In other words, it is desirable to have a 'conversation' between two or more parties, whether they are human beings or electronic devices. This greatly increases the complexity of the wireless signals required to effectively communicate.

With the introduction of wireless technology for the telephone, the sheer numbers of parties desiring to communicate wirelessly have increased substantially. The wireless telephones developed into multifunctional devices that not only functioned to relay voice communications, but data as well. Some devices have also incorporated interfaces to the Internet to allow users to browse the World Wide Web and even download/upload files. Thus, the devices have been transformed from a simple voice device to a "multimedia" device that enables users to receive/transmit not only sound, but also images/video as well. All of these additional types of media have tremendously increased the demand for communication networks that support these media services. The freedom to be 'connected' wherever a person or device happens to be located is extremely attractive and will continue to drive future increases in network demand.

Thus, the 'airwaves' in which wireless signals are sent become increasingly crowded. Complex signals are employed to utilize signal frequencies to their fullest extent. However, due to the sheer numbers of communicating entities, it is often not enough to prevent 'collisions' of signals. When collisions occur, a receiving entity may not be able to properly interpret the signal and may lose information associated with that signal. This drastically reduces the efficiency of a communication network, requiring multiple sends of the information before it can be properly received. In the worst case, the data may be totally lost if it cannot be resent. If a network has hundreds or even thousands of users, the probability of a signal collision increases substantially. The demand for wireless communications is not decreasing. Therefore, it is reasonable to assume that signal collisions will also increase, degrading the usefulness of existing technology. A communication system that can avoid this type of data corruption will be able to provide increased reliability and efficiency to its users.

SUMMARY

The following presents a simplified summary in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Embodiments of the systems and methods described herein relate generally to data communications using OFDM, and more particularly to systems and methods for selecting an initial pilot sub-carrier frequency group for a wireless communication system.

In accordance with one particular embodiment, a method for facilitating data communication includes obtaining a pilot staggering sequence for a pilot signal, and shifting an order of the pilot staggering sequence to mitigate collisions of the pilot signal with other pilot signals.

In one embodiment randomized starting sub-carrier frequency group of the pilot is utilized in a first orthogonal frequency division multiplexing (OFDM) symbol of a frame. In another embodiment, the starting pilot sub-carrier frequency group number is determined by utilizing a random number generator such as, for example, a Pseudo-Noise (PN) sequence generator, seeded by a communication system parameter such as, for example, a network identification (ID) number. In this manner, the starting sub-carrier frequency group is specific to that particular network. This allows a multiple network system to communicate robustly by substantially reducing the probability of pilot interferences, improving reception quality and coverage. The embodiment(s) also provides a more scalable system, permitting system bandwidth to be traded for coverage. One embodiment is a method for facilitating data communication that obtains a pilot staggering sequence for a pilot signal and shifts an order of the pilot staggering sequence to mitigate collisions of the pilot signal with other pilot signals. Another embodiment is a system that facilitates data communication by utilizing a receiving component that receives at least one pilot staggering sequence for at least one pilot signal and a sequence determination component that shifts an order of the pilot staggering sequence to decrease a probability of a collision of the pilot signal with another pilot signal.

To the accomplishment of the foregoing and related ends, certain illustrative embodiments of the invention are described herein in connection with the following description and the annexed drawings. These embodiments are indicative, however, of but a few of the various ways in which the principles of the invention may be employed and the subject invention is intended to include all such embodiments and their equivalents.

DETAILED DESCRIPTION

Figure 1:
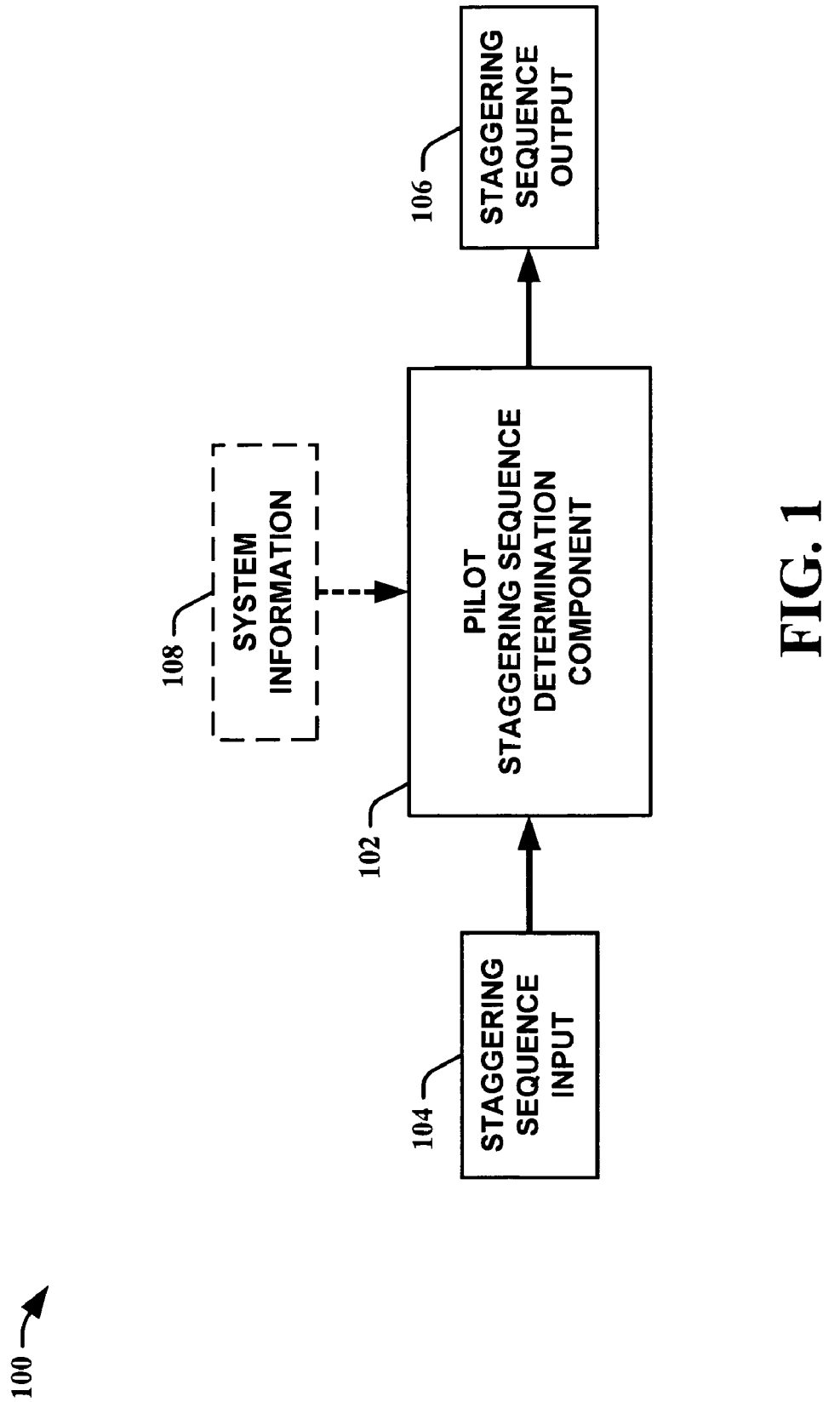
FIG. 1 is a block diagram of a data communication facilitating system in accordance with an embodiment of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject embodiments may be practiced without these specific details. In other instances, well-known structures and devices are shown in block diagram form in order to facilitate describing the embodiments. As used in this application, the term "component" is intended to refer to an entity, either hardware, software, a combination of hardware and software, or software in execution. For example, a component may be, but is not limited to being, a processor, a process running on a processor, and/or a multiplexer and/or other signal facilitating devices and software.

In accordance with the subject embodiments and corresponding disclosure thereof, various aspects are described in connection with a subscriber station. A subscriber station can also be called a system, a subscriber unit, mobile station, mobile, remote station, access point, base station, remote terminal, access terminal, user terminal, user agent, or user equipment. A subscriber station may be a wireless telephone, a cordless telephone, a Session Initiation Protocol (SIP) phone, a wireless local loop (WLL) station, a personal digital assistant (PDA), a handheld device having wireless connection capability, or other processing device connected to a wireless modem.

Systems and methods are provided that mitigate pilot signal interferences between a plurality of wireless networks and is especially suited to facilitate multimedia communication systems that typically have extremely dense and complex communication signals for a given transmission area. Pilot signals are utilized by communication systems to facilitate in proper reception of communication data. They can assist in, for example, the detection of carrier signals and/or gain control settings. Generally, the pilot signals contain predetermined data that allows a communication system to adjust itself to this reference data. By shifting starting state of pilot staggering sequences, the probability of collisions between pilot signals of different networks is substantially decreased, allowing proper reception of these important signals.

The shifting can be accomplished, for example, in the first symbol of a frame of an OFDM-based system. In one embodiment, communication system parameters such as network IDs and the like can be employed to seed a PN sequence generator to determine the starting state of the pilot staggering sequence to facilitate in shifting the ordering. This permits a decrease in pilot collision probability among different networks, greatly enhancing overall efficiency of a wireless system, improving reception quality and/or coverage. The embodiment(s) also provides a more scalable system where system bandwidth can be reduced to increase coverage. This allows optimization of a system as needed to meet changing system requirements.

Communication systems are widely deployed to provide various communication services such as voice, packet data, and so on. These systems may be time, frequency, and/or code division multiple-access systems capable of supporting communication with multiple users simultaneously by sharing the available system resources. Examples of such multiple-access systems include Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

The subject embodiment(s) are utilized with OFDM-based communication systems and the like. Thus, knowledge of such systems facilitates in understanding the applications of the subject invention. OFDM, or multi-carrier modulation, employs multiple sub-carriers to deliver data between systems. High speed serial data is divided into multiple lower speed sub-signals that a system can transmit simultaneously at different frequencies in parallel. This allows high spectral efficiency, robustness against RF interference, and reduced lower multi-path distortion. The OFDM orthogonal characteristics permit sub-channels to overlap and, thus, increase the spectral efficiency. Therefore, an OFDM-based wireless system can meet the high bandwidth demands of applications such as, for example, multimedia applications utilized in highly saturated RF areas.

In one wireless standard, an OFDM physical layer divides a data signal into 52 separate sub-carriers to provide transmission of data at varying rates. Groups of symbols or "frames" are transmitted within each sub-carrier. The symbols contain bits of data that need to be transported. Typically, four of the sub-carriers are pilot sub-carriers that the system employs as a reference to mitigate signal frequency and/or phase shifts during transmission. Each transmitting network within the system is required to transmit a pilot sub-carrier to facilitate in correctly receiving and interpreting the data transmission. The pilot sub-carriers are always present, whether or not pilot information is being transmitted. However, the remaining sub-carriers are open to transmit data according to system demands and may or may not contain data. Generally, a preamble frame, containing multiple symbols, is transmitted so that a receiver can intercept it and utilize it to facilitate in capturing an incoming OFDM signal and to synchronize its demodulator. In this manner, gain control and course carrier signal frequency can be determined and fine tuned, training the receiver. It should be noted that the above is but one example as there is no single industry standard and both proprietary and non-proprietary standards exist as well.

A pilot signal is generally composed of a staggered sequence (to increase resolution) of sub-carrier frequency groups that form a "pilot staggering sequence." A preferred embodiment of such a sub-carrier frequency group is called an "interlace." That is, the sub-carriers of an OFDM symbol is sub-divided into I interlaces indexed from 0 to I−1. Each interlace consists of P sub-carriers where the sub-carries are spaced I×Δf apart in frequency, with Δf being the sub-carrier spacing. Thus, if there exist 8 interlaces, for example, the pilot interlace set can be comprised of 8 staggered interlaces selected from these 8 interlaces, in any determined order. Although the interlace at any given moment can change, the order of the change, or stagger, remains constant. This means that if two networks are utilizing the same pilot staggering sequence, they will change, or "hop," to a given interlace frequency at substantially the same moment in time. So, despite changing the interlace within the pilot staggering sequence, the two networks will still interfere with each other's pilot signals. Accordingly, a means to mitigate this signal interference by altering the starting interlace of the pilot staggering sequence is provided. This allows the pilot interlace to stagger as before, but increases the probability that it will be staggering the interlaces out of synchronization with a network operating with the same pilot staggering sequence.

In FIG. 1, a block diagram of a data communication facilitating system 100 in accordance with an embodiment is shown. The communication facilitating system 100 is comprised of a pilot staggering sequence determination component 102. It 102 receives a staggering sequence input 104 and provides a staggering sequence output 106 that has been enhanced to facilitate in mitigating pilot signal interferences. The pilot staggering sequence determination component 102 can also utilize optional data system information 108 to facilitate in determining the staggering sequence output 106. In this manner, communication system parametric data specific to a particular network can be employed so that the staggering sequence output 106 is substantially unique to that network.

For example, if a staggering sequence is composed of interlaces 2, 1, 5, and 6, the possible starting interlace selections are limited to the four interlaces of the staggering sequence. This allows up to four networks to have different starting interlaces, namely either 2, 1, 5, or 6, substantially decreasing pilot signal interferences. Since the staggering sequence pattern remains the same but the starting interlace varies, the staggering sequences will be out of synchronization between the networks, allowing a greater probability that the pilot signals can be received without interference. Random selection of a starting sequence from a small staggering sequence will likely cause redundant initial starting interlaces as the number of networks increase. Thus, the probability of a signal collision will naturally increase as well for networks that employ an identical staggering sequence pattern. This probability can be reduced by increasing the number of interlaces in the staggering sequence so that the odds of two networks employing the same starting interlace is decreased. The probability can also be further reduced by utilizing parametric data specific to a network. This makes the starting sequence related to a specific network and/or groups of networks, reducing the probability of two networks with the same starting interlace and staggering sequence.

Figure 2:
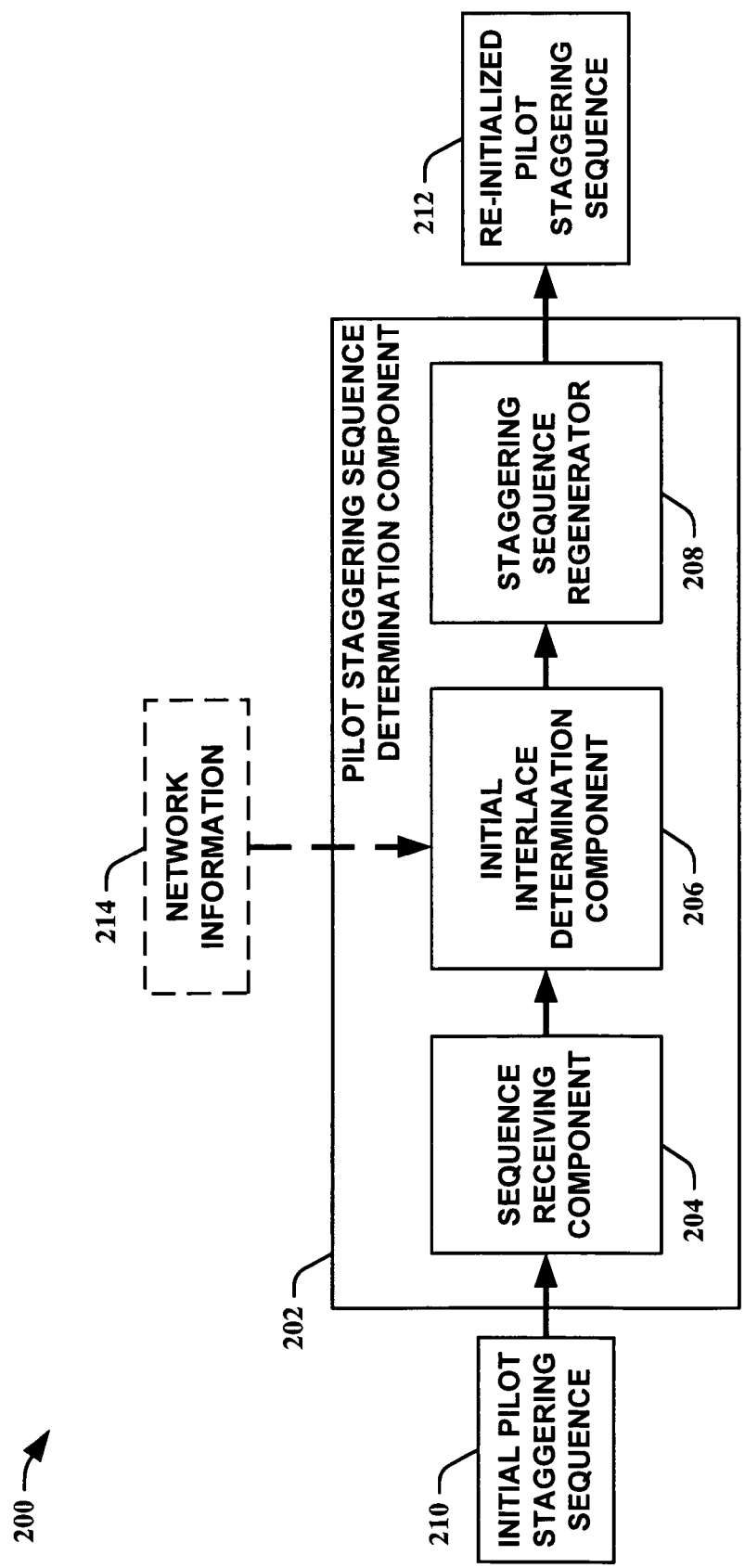
FIG. 2 is another block diagram of a data communication facilitating system in accordance with an embodiment of the subject invention.

Referring to FIG. 2, another block diagram of a data communication facilitating system 200 in accordance with an embodiment of the subject invention is depicted. The data communication facilitating system 200 is comprised of a pilot staggering sequence determination component 202. The pilot staggering sequence determination component 202 is comprised of a sequence receiving component 204, an initial interlace determination component 206, and a staggering sequence regenerator 208. The sequence receiving component 204 receives an initial pilot staggering sequence 210 and conveys it 210 to the initial interlace determination component 206. The initial interlace determination component 206 determines a new starting interlace number based on the initial pilot staggering sequence 210. The initial interlace determination component 206 can also utilize optional network information 214 in determining the new starting interlace number. The staggering sequence regenerator 208 receives the new starting interlace number along with the initial pilot staggering sequence 210 and generates a re-initialized pilot staggering sequence 212 utilizing the new starting interlace number. One skilled in the art can appreciate that some functionality of the pilot staggering sequence determination component 202 can reside in other components. Thus, for example, the sequence receiving component 204 can be external to the pilot staggering sequence determination component 202 and/or be incorporated directly in the initial interlace determination component 206.

If, for example, the initial pilot staggering sequence 210 is (2, 4, 3, 0, 1) and a new starting interlace number is selected by the initial interlace determination component 206 to be "3," a possible re-initialized pilot staggering sequence can be (3, 0, 1, 2, 4). The selection of "3" can be a random process by the initial interlace determination component 206 and/or it can be a network information 214 biased random process and/or a predetermined offset value based on the network information 214. For example, particular networks can be limited to only even valued starting interlaces, thus, reducing the number of random choices. The network information 214 can include, but is not limited to, network identifiers, network bandwidth, and/or other network specific and/or non-specific information. Thus, a predetermined offset value can be based on the network information 214 to influence the new starting interlace number. For example, a network ID can be normalized and offset by, for example, a value of two. If network IDs are incremented by 100's, then a set of networks might have IDs of 100, 200, 300, etc. A normalized value then could include values of 1, 2, and 3 for the networks. This value can then be offset in the example so that the first network has an interlace start position of (1+2)=3, the second network has an interlace start position of (2+2)=4, and the third network has an interlace start position of (3+2)=5 and so forth. If the initial pilot staggering sequence 210 is, for example, (2, 1, 0, 5, 7, 6, 4, 3), the first network sequence starts with the interlace in position three of the sequence such that the new sequence is (0, 5, 7, 6, 4, 3, 2, 1). Likewise, for the second network, the new sequence is (5, 7, 6, 4, 3, 2, 1, 0), and for the third network, the new sequence is (7, 6, 4, 3, 2, 1, 0, 5). A similar new sequence ordering can be accomplished by incrementing for each new network regardless of the networks specific ID (e.g., having an offset of zero). One skilled in the art will appreciate that the flexibility of the subject invention allows numerous additional ways to influence the selection of the starting interlace number and fall within its scope.

Figure 3:
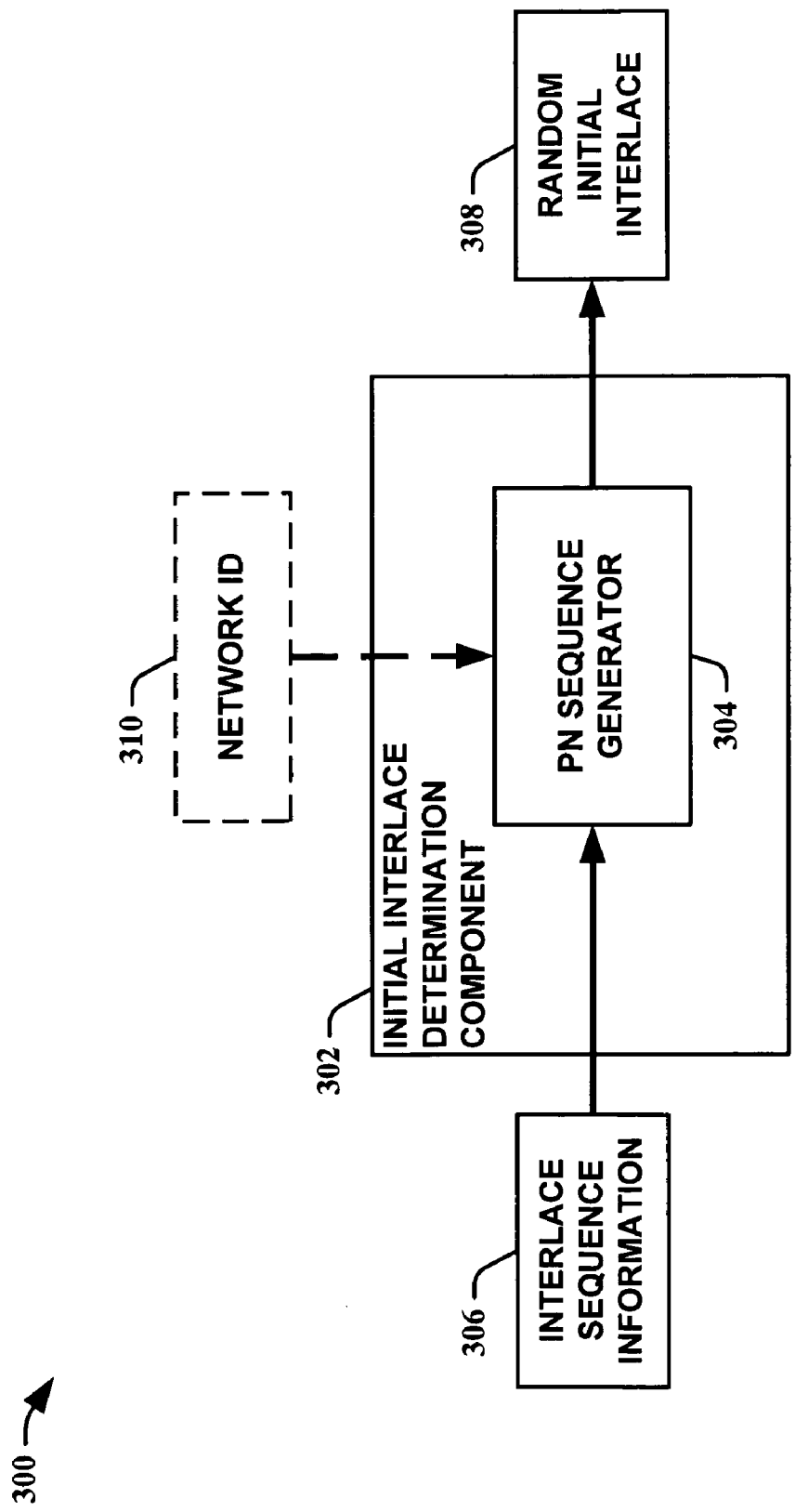
FIG. 3 is yet another block diagram of a data communication facilitating system in accordance with an embodiment of the subject invention.

Turning to FIG. 3, yet another block diagram of a data communication facilitating system 300 in accordance with an embodiment of the subject invention is illustrated. The data communication facilitating system 300 is comprised of an initial interlace determination component 302. The initial interlace determination component 302 is comprised of a pseudo-noise (PN) sequence generator 304 that receives interlace sequence information 306 and provides a random initial interlace 308. The PN sequence generator can accept network information such as optional network ID 310. This allows the random selection process provided by the PN sequence generator 304 to be seeded by network specific information, decreasing the probability that any two networks will have the same starting interlace number for their pilot signals, substantially reducing pilot signal interferences. The random initial interlace 308 can be employed by communication systems to enhance their pilot staggering sequences to facilitate in reducing pilot signal interferences.

Figure 4:
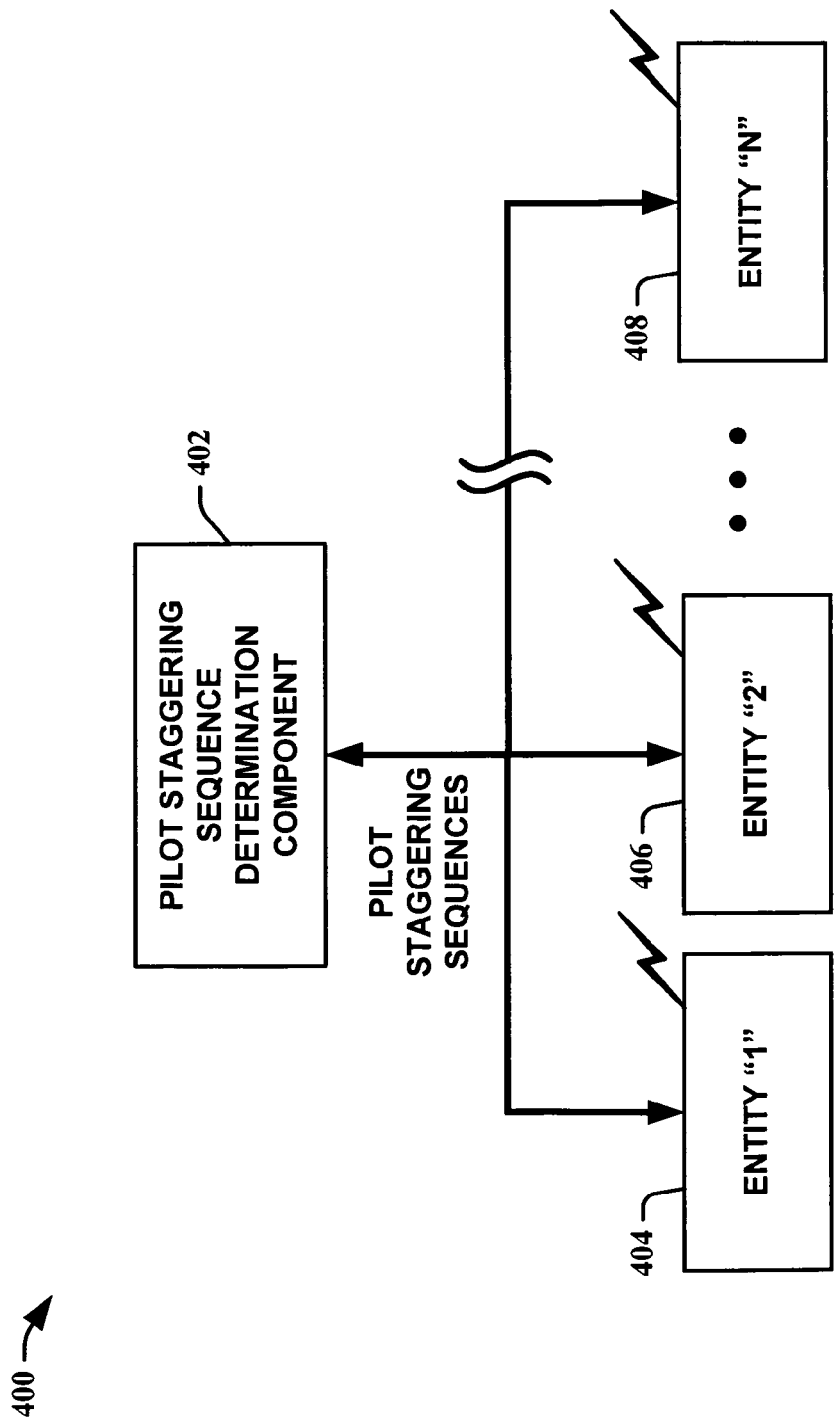
FIG. 4 is a block diagram of a data communication facilitating system interfacing with multiple entities in accordance with an embodiment of the subject invention.

Looking at FIG. 4, a block diagram of a data communication facilitating system 400 interfacing with multiple entities in accordance with an embodiment of the subject invention is shown. The data communication facilitating system 400 is comprised of a pilot staggering sequence determination component 402 and entities 1-N 404-408, where N represents an integer from one to infinity. The entities 1-N 404-408 can include, but are not limited to, networks and the like. In this embodiment, the pilot staggering sequence determination component 402 generates and dictates pilot staggering sequences to the entities 1-N 404-408. The generated sequences can include biased random sequences, predetermined offset sequences, and/or combinations of both. In this manner, pilot signal interferences can be substantially reduced because the pilot staggering sequence determination component 402 can attempt to eliminate any conflicting pilot staggering sequences among the entities 1-N 404-408. The pilot staggering sequence determination component 402 can reside external to the entities 1-N 404-408 and/or internal to one or more of the entities 1-N 404-408. Communications between the pilot staggering sequence determination component 402 and the entities 1-N 404-408 can include, but are not limited to, wireless communications and/or wired communications.

An autonomous embodiment of the pilot staggering sequence determination component 402 that utilizes predetermined sequence biasing can also reside in a plurality of the entities 1-N 404-408. Thus, the predetermined starting interlace offset can be utilized to enhance a pilot staggering sequence in a known and predictable manner to mitigate pilot signal limitations. This allows optimum pilot signal interference reduction even when communication between the pilot staggering sequence determination component 402 and other possibly interfering entities is not practicable.

For an OFDM broadcasting system, transmitters are assumed to be distributed across a wide geographical region, e.g., the continental United States, with typical spacing of about 60 km. Transmissions occur in a 6 MHz bandwidth at an RF frequency in the lower 700 MHz (VHF) band and can be classified into two categories: (a) national, which are common over a wide coverage area, (b) local, which are of interest in sub-regions. Thus, since the content belonging to different networks can differ between transmitters, neighboring transmissions can interfere with each other.

Figure 5:
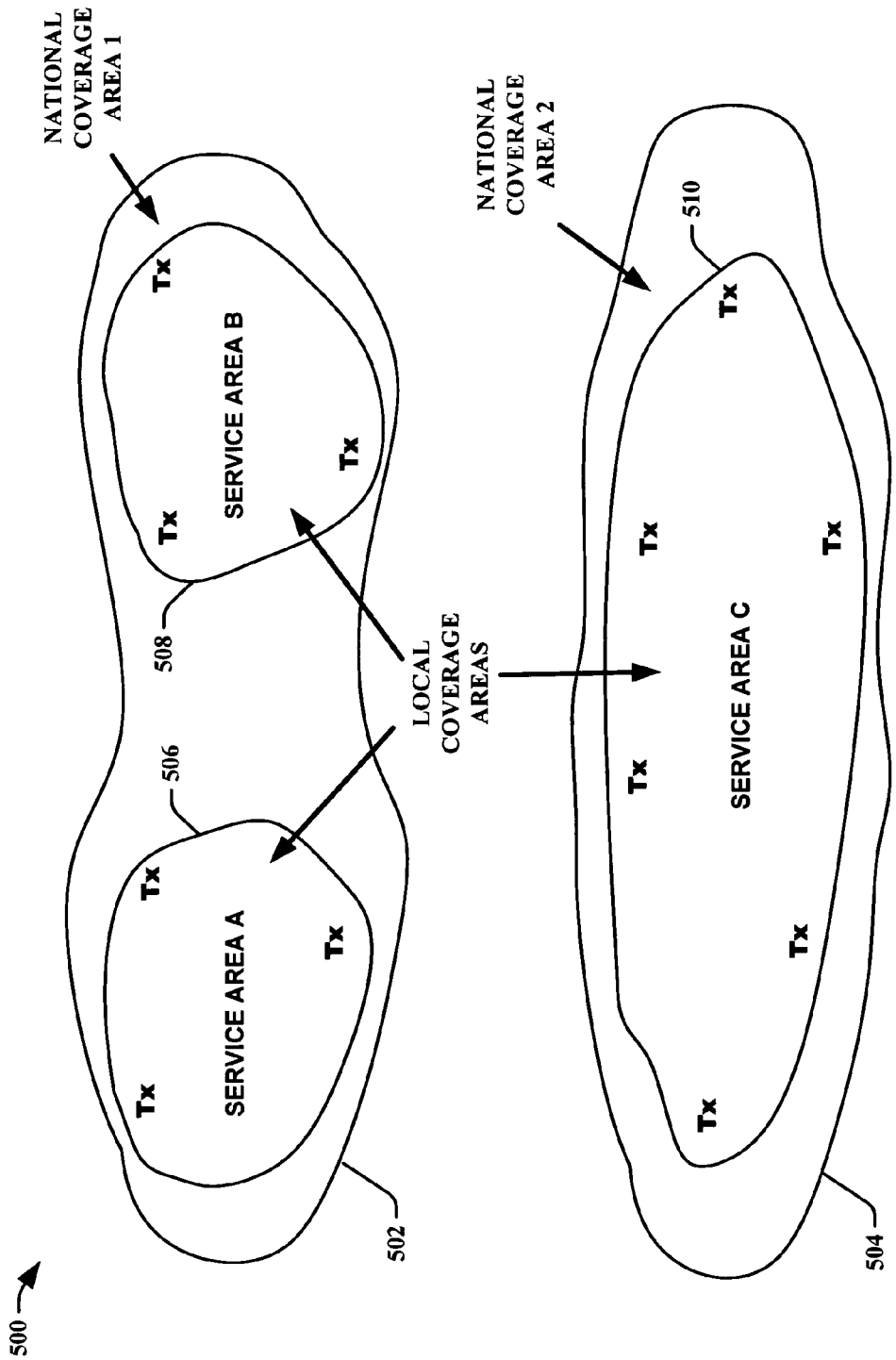
FIG. 5 is a diagram of network coverage areas in accordance with an embodiment of the subject invention.

The above observations are illustrated in FIG. 5 which shows an example of network topology 500. Two types of network transmitters are shown: national and local. The National Programs 1 502 and 2 504 are transmitted by all the transmitters marked "Tx" in National Coverage Areas 1 502 and 2 504, respectively, and are received in an area within an outermost coverage contour. Local Programs A, B, C are transmitted in the Local Coverage Areas A 506, B 508, and C 510, respectively and are received in an area within an outermost coverage contour. Within each local area 506-510, transmitters transmit the same local programs. However, in the region between the two different type coverage areas, for example, between two transmitters that belong to different national networks or different local networks, the transmissions interfere, most likely resulting in "holes/gaps" in the corresponding coverage areas.

Figure 6:
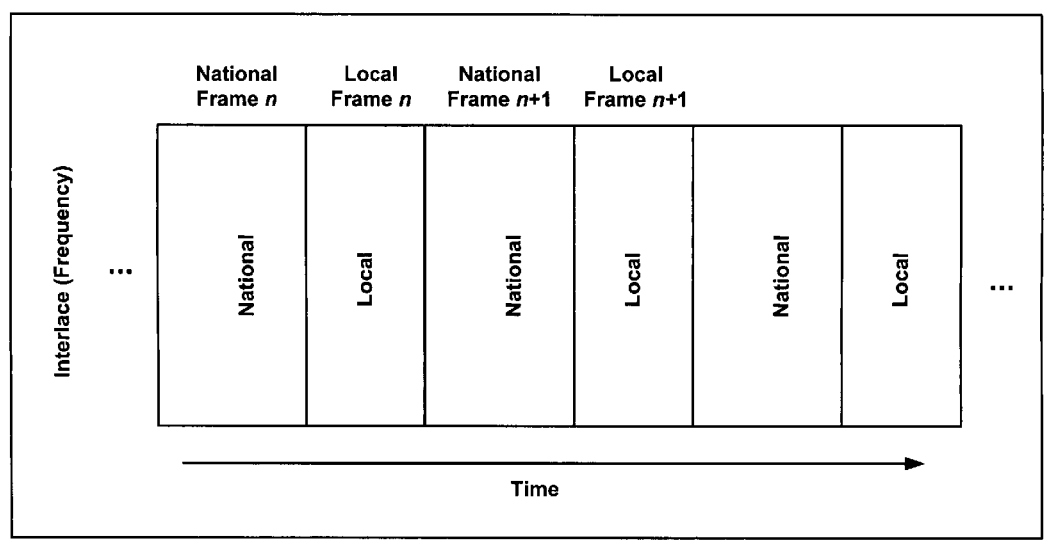
FIG. 6 is an illustration of national and local frame interleaving in accordance with an embodiment of the subject invention.
Figure 7:
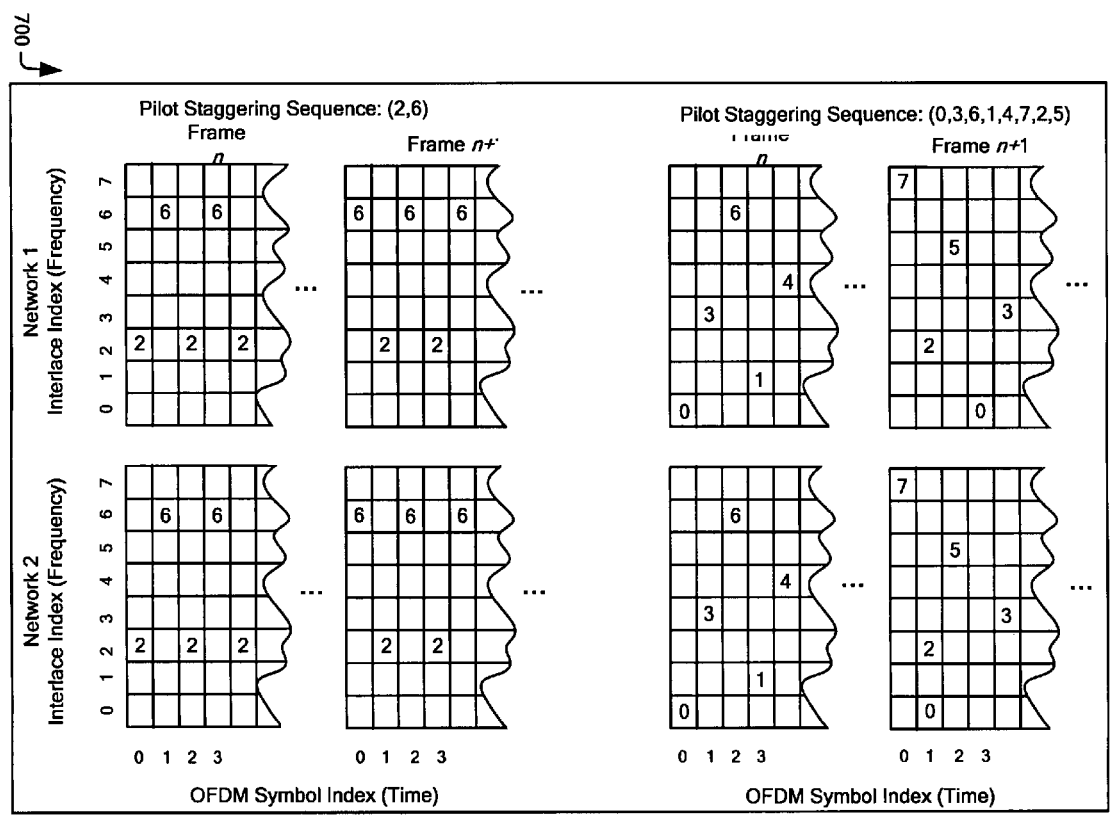
FIG. 7 is an example of pilot staggering patterns in accordance with an embodiment of the subject invention.

For some OFDM systems, national and local programs are transmitted in a time division multiplexing (TDM) fashion 600 as shown in FIG. 6. As a result, the national and local transmissions do not interfere with each other since they are transmitted in different time frames. However, national or local transmissions belonging to different networks will interfere with each other, creating holes/gaps among coverage areas. For example, in one wireless communication system, frequency is divided into 8 interlaces. Pilot and data are transmitted in different interlaces. For the (2,6) pilot staggering pattern, the pilot is transmitted in interlace 2 and interlace 6 alternately from OFDM symbol to OFDM symbol. For the (0, 3, 6, . . . ) pattern, the pilot is transmitted in interlace 0, 3, 6, 1, 4, 7, 2, 5 and repeats from OFDM symbol to OFDM symbol. Data can utilize all the leftover interlaces. FIG. 7 illustrates a structure 700 utilizing the same frequency interlace at the beginning of a frame with two example pilot staggering patterns.

Under this structure 700, at any OFDM symbol time, the pilot is transmitted in the same interlace and data for all networks. Therefore, the probability of collision among pilots from different networks is 100%. Note that the pilot is always present. However, this is not the case for data, i.e., not all the interlaces set aside for data are utilized by data due to imperfections in a scheduler or light loading of data, resulting in unoccupied interlaces from time to time. These unoccupied interlaces of a network transmission create "breathing room" for data interlaces of other networks. However, the pilot always experiences the full interference regardless of system data loading. For example, for the (2,6) staggering case shown in FIG. 7, at time 1 of frame n, the pilot interlaces for network 1 and network 2 are both 6, therefore, the pilots for both networks interfere with each other. However, some of the interlaces utilized by network 1 at time 1 frame n may not be utilized by network 2, depending on the scheduling and system loading, therefore, receiving no interference from network 2. This imbalance between pilot and data make this kind of structure eventually 'pilot interference limited,' i.e., reducing the system loading (reducing total interferences among networks) does not improve the reception quality or coverage.

Figure 8:
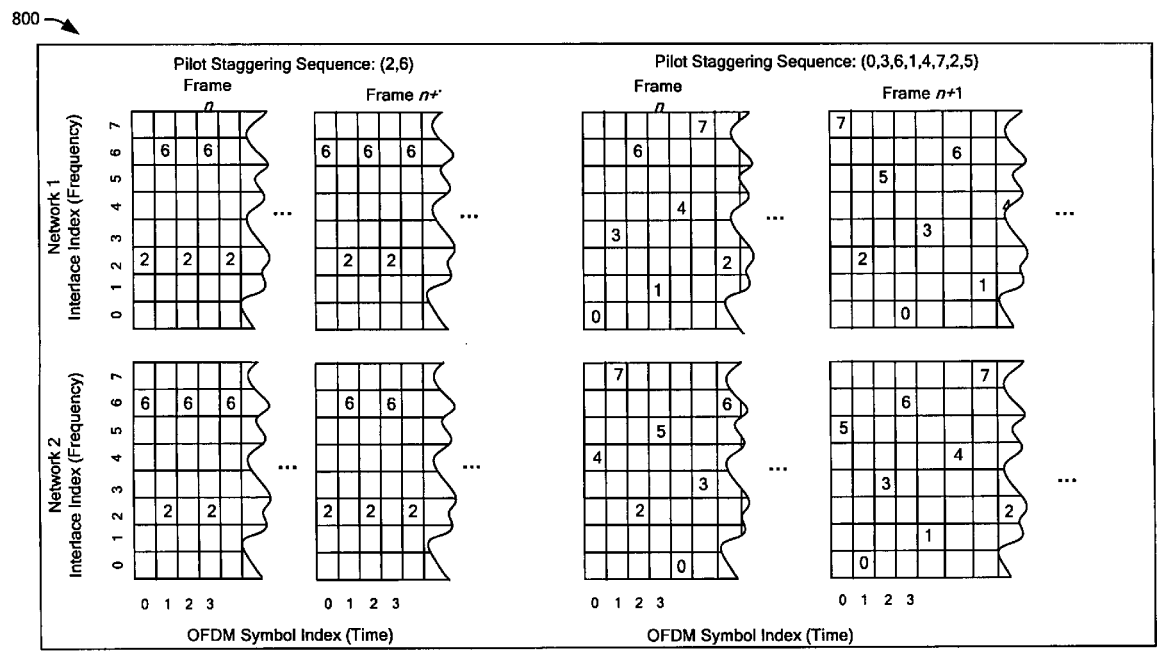
FIG. 8 is an illustration of randomized pilot frequency interlacing structure in accordance with an embodiment of the subject invention.

In FIG. 8, an illustration of randomized pilot frequency interlacing structure 800 in accordance with an embodiment of the subject invention is shown. The subject invention reduces the imbalance between pilot and data. FIG. 8 depicts a pilot structure 800 that utilizes a random pilot interlace at a beginning of a frame. Two pilot staggering patterns are shown as examples. At the beginning of each frame, a starting interlace for a pilot staggering sequence is determined randomly, i.e., a pilot interlace number is determined by a random number generator, such as, for example, a pseudo-noise (PN) sequence generator, seeded by a network ID number. The pilot interlaces for the following OFDM symbols are determined by the staggering sequence. For the (2,6) staggering pattern, the pilot interlace of the first OFDM symbol of a frame is randomly selected from interlace 2 and interlace 6. For the (0, 3, 6, . . . ) staggering pattern, the pilot interlace for the first OFDM symbol of each frame is randomly selected from eight interlaces, interlace 0 to interlace 7. This reduces the probability of a collision between two network's pilots. For example, for the (2,6) staggering case in FIG. 8, at time 1 of frame n, the pilot interlace for network 1 is 2 and network 2 is 6. The interlace 2 of network 1 may not be occupied by data for that OFDM symbol, therefore, the pilot for network 1 may not receive interference from network 2 for that OFDM symbol. Hence, the pilot can utilize the interference break like the data. This effectively improves the balance between pilot and data and, consequently, improves the reception quality and/or coverage. It also makes the system more scalable, i.e., the system bandwidth can be traded for coverage. That is to say, the system loading can be reduced to increase the coverage.

Figure 9:
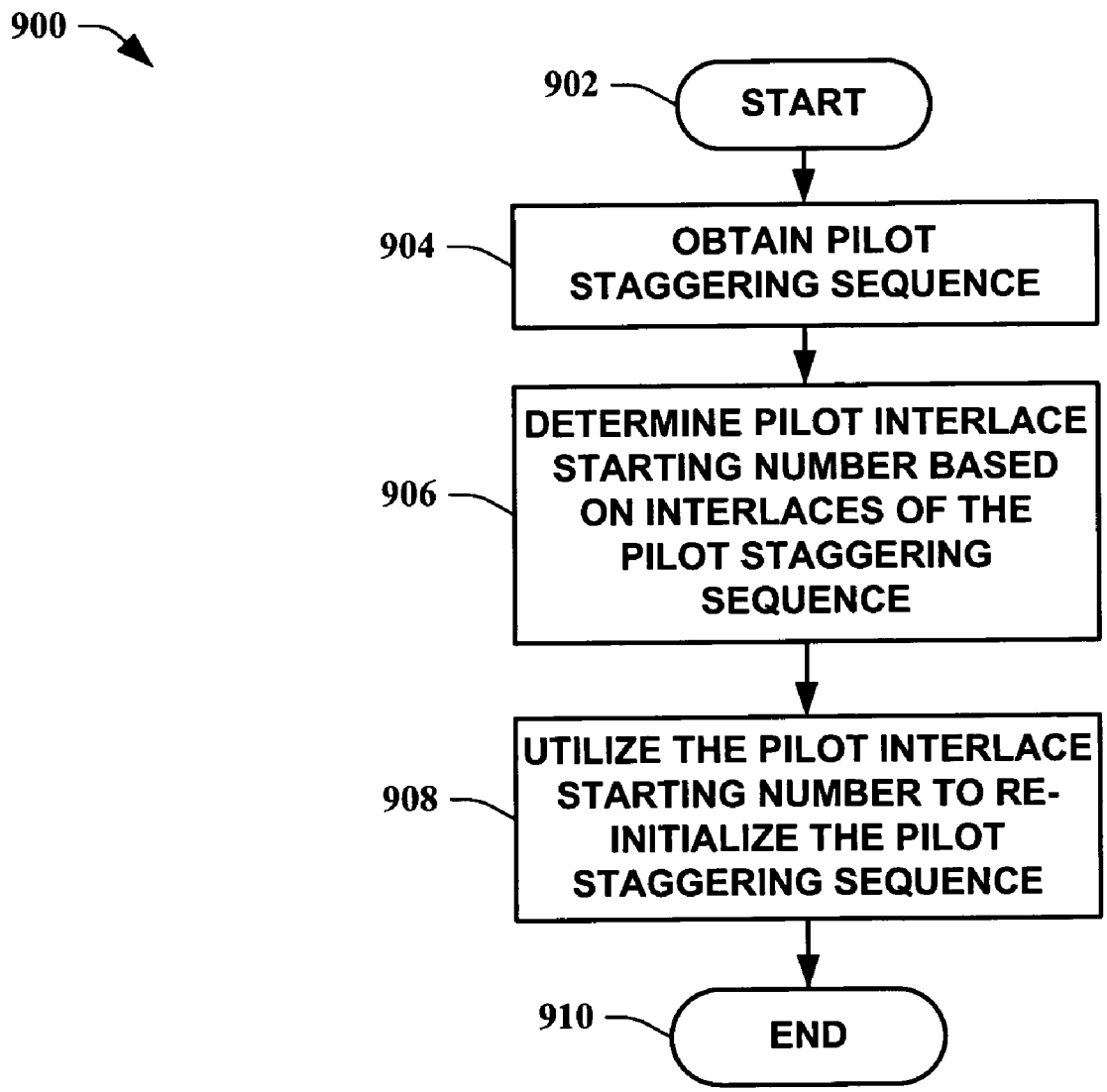
FIG. 9 is a flow diagram of a method of facilitating data communication in accordance with an embodiment of the subject invention.
Figure 10:
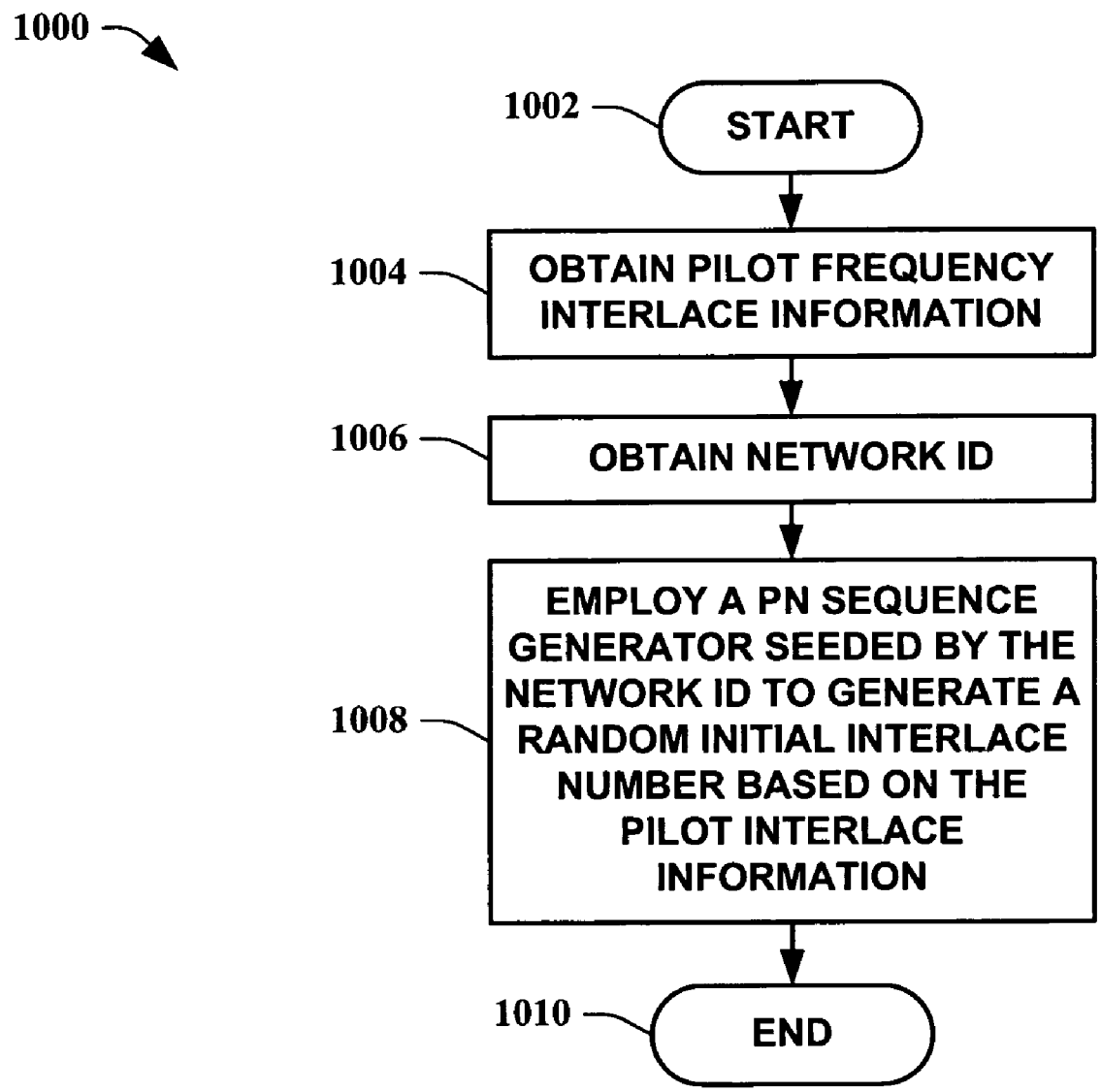
FIG. 10 is another flow diagram of a method of facilitating data communication in accordance with an embodiment of the subject invention.

In view of the exemplary systems shown and described above, methodologies that may be implemented in accordance with the subject invention will be better appreciated with reference to the flow charts of FIGS. 9-10. While, for purposes of simplicity of explanation, the methodologies are shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodologies in accordance with the subject invention.

In FIG. 9, a flow diagram of a method 900 of facilitating data communication in accordance with an embodiment of the subject invention is shown. The method 900 starts 902 by obtaining a pilot staggering sequence 904. A pilot interlace starting number is then determined based on the interlaces of the pilot staggering sequence 906. The determination can be based on a random selection process and/or a predetermined selection process. The random selection process can also be seeded by communication system parameters and the like to further reduce the probability of generating like pilot staggering sequences for two networks. The predetermined selection process can also employ communication system parameters as well. This allows an automated determination to be performed such that, for example, networks within a particular system have the greatest probability of not interfering with each other. This type of selection system can be constructed by maximizing a probability equation that is based upon the available interlaces from the pilot staggering sequence and a predetermined method of offsetting each network's starting interlace. The offset itself can be predetermined and/or biased on a communication system parameter. The pilot interlace starting number is then utilized to re-initialize the pilot staggering sequence 908, ending the flow 910. In this manner, additional sequences with a high probability of non-interference are generated for a network and/or a set of networks. If communications are available between networks in a system, a higher probability of non-interference can be established by ensuring that each network has a different starting interlace.

Referring to FIG. 10, another flow diagram of a method 1000 of facilitating data communication in accordance with an embodiment of the subject invention is depicted. The method 1000 starts 1002 by obtaining pilot frequency interlace information 1004. The pilot frequency interlace information can include a listing of interlaces that make up a pilot staggering sequence. A network ID associated with the pilot frequency interlace information is then obtained as well 1006. Additional communication system and/or network parameters can also be utilized by the subject invention. A random generator such as, for example, a PN sequence generator seeded by the network ID is then employed to generate a random initial interlace number based on the pilot interlace information 1008, ending the flow 1010. The initial or starting interlace number can then be employed by a communication system to decrease the probability of pilot signal interferences by enhancing their pilot staggering sequences.

Figure 11:
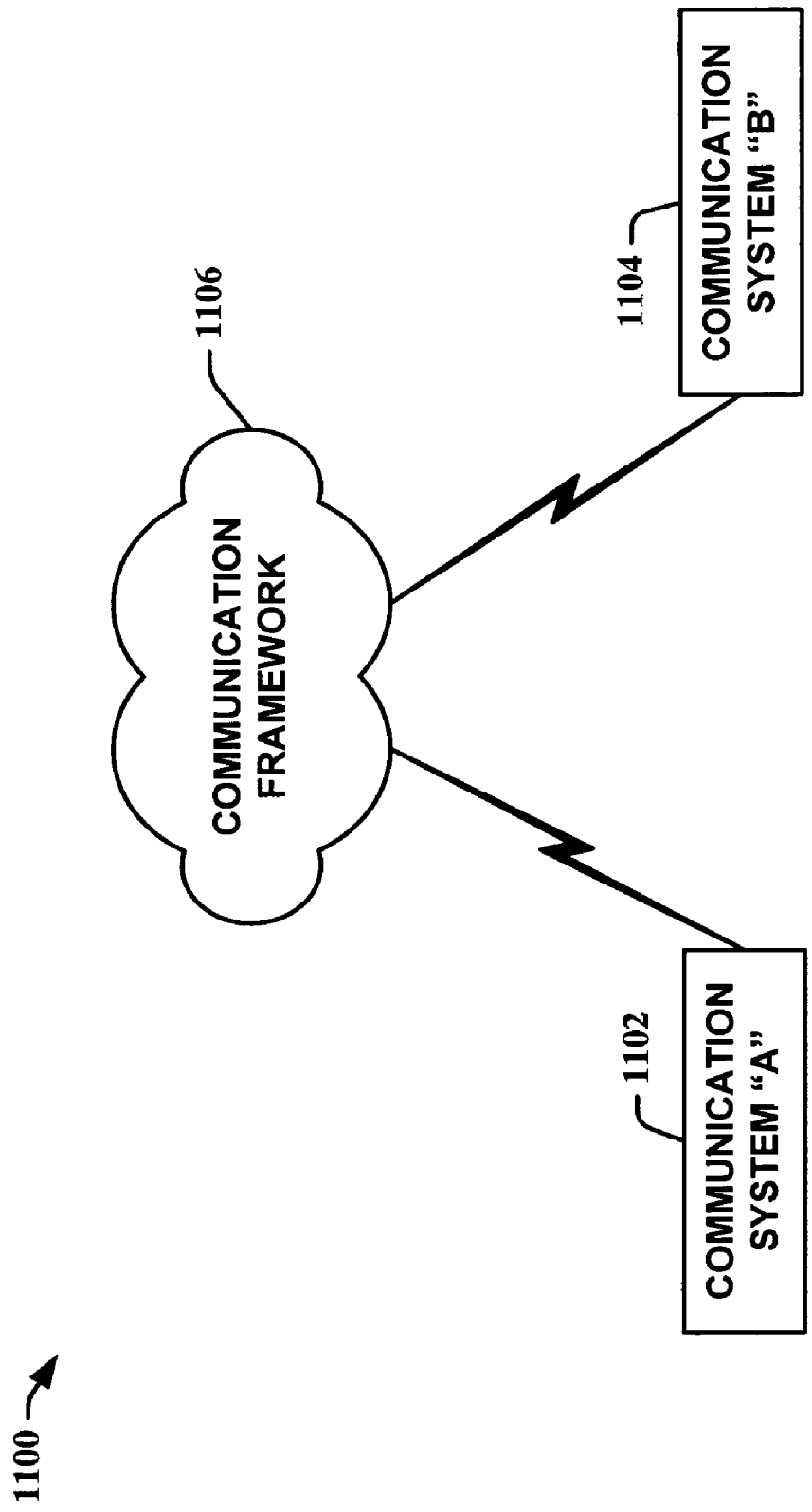
FIG. 11 illustrates an example communication system environment in which the subject invention can function.

FIG. 11 is a block diagram of a sample communication system environment 1100 with which the subject invention can interact. The system 1100 further illustrates two representative communication systems A 1102 and B 1104. One possible communication between systems A 1102 and B 1104 may be in the form of a data packet adapted to be transmitted between two or more communication systems. The system 1100 includes a communication framework 1106 that can be employed to facilitate communications between the communication system A 1102 and communication system B 1104.

In one embodiment, a data packet transmitted between two or more communication system components that facilitates data communications is comprised of, at least in part, information relating to an initial pilot staggering sequence interlace selected to mitigate pilot signal collisions.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for facilitating wireless data communication using OFDM over at least two networks, comprising:
    receiving an initial pilot group staggering sequence including two or more interlaces beginning with an initial starting interlace number, wherein the initial pilot group staggering sequence staggers as a function of time;
    determining a first interlace starting position for a first network, the first interlace starting position indicating a first interlace position in the initial pilot sequence;
    determining a first starting interlace number for the first network based on the initial pilot group staggering sequence and the first interlace starting position, wherein the first starting interlace number is the respective interlace in the initial pilot group staggering sequence located in the first interlace position indicated by the first interlace starting position;

re-ordering the initial pilot group staggering sequence a first time to generate a first pilot staggering sequence to apply to the first network, the first pilot staggering sequence beginning with the first starting interlace number;

determining a second interlace starting position for a second network, the second interlace starting position indicating a second interlace position in the initial pilot sequence;

determining a second starting interlace number for the second network based on the initial pilot group staggering sequence and the second interlace starting position, wherein the second starting interlace number is the respective interlace in the initial pilot group staggering sequence located in the second interlace position indicated by the second interlace starting position; and re-ordering the initial pilot group staggering sequence a second time to generate a second pilot staggering sequence to apply to the second network to mitigate collisions of a first pilot signal applied in the first network and a second pilot signal in the second network, the second pilot staggering sequence beginning with the second starting interlace number.

2. The method of claim 1 further comprising:
utilizing the first pilot staggering sequence in a first symbol of a frame of a communication signal.

3. The method of claim 1 further comprising:
employing at least one communication system parameter to facilitate in determining at least one of the first or the second interlace starting number.

4. The method of claim 3, wherein the at least one communication system parameter comprises at least one network identification (ID).

5. The method of claim 1, wherein determining at least one of the first interlace starting position or the second interlace starting position further comprises:
employing a random number generator to select at least one of the first interlace position or the second interlace position from the interlaces of the initial pilot group staggering sequence.

6. The method of claim 5, wherein the random number generator comprises a pseudo-noise (PN) sequence generator.

7. The method of claim 6 further comprising:
utilizing at least one network identification (ID) to seed the pseudo-noise (PN) sequence generator.

8. The method of claim 1, wherein determining at least one of the first interlace starting position or the second interlace starting position further comprises:
utilizing a starting interlace offset based on a communication system parameter.

9. The method of claim 8, wherein the communication system parameter comprises a network identification (ID).

10. A multimedia communication system employing the method of claim 1.

11. A system that facilitates wireless data communication over at least two networks using OFDM, comprising:
a receiving component that receives an initial pilot group staggering sequence, the initial pilot group staggering sequence including two or more interlaces beginning with an initial starting interlace number, wherein the pilot staggering sequence staggers as a function of time;
at least one interlace starting position determining component that determines a first interlace starting position for a first network and a second interlace starting position for a second network, each interlace starting position indicating an interlace position in the initial pilot sequence;
at least one starting interlace number determining component that determines a first starting interlace number for the first network based on the initial pilot group staggering sequence and the first interlace starting position, and a second starting interlace number for the second network based on the initial pilot group staggering sequence and the second interlace starting position, wherein the first starting interlace number is the respective interlace in the initial pilot group staggering sequence located in the respective interlace position indicated by the first interlace starting position and wherein the second starting interlace number is the respective interlace in the initial pilot group staggering sequence located in the respective interlace position indicated by the second interlace starting position; and
at least one sequence determination component that re-orders the initial pilot group staggering sequence a first time to generate a first pilot staggering sequence to apply to the first network, and re-orders the initial pilot group staggering sequence a second time to generate a second pilot staggering sequence to apply to the second network so as to decrease probability of a collision of a first pilot signal applied in the first network and a second pilot signal applied in the second network.

12. The system of claim 11, wherein the sequence determination component utilizes at least one communication system parameter to facilitate in determining at least one of the first or the second starting interlace number.

13. The system of claim 12, wherein the communication system parameter comprising a network identification (ID).

14. The system of claim 11, wherein the sequence determination component utilizes a random number generator to facilitate in deriving at least one of the first interlace starting position or the second interlace starting position.

15. The system of claim 14, wherein the random number generator is comprised of a pseudo-noise (PN) sequence generator.

16. The system of claim 15, wherein the sequence determination component utilizes at least one network identification (ID) to seed the pseudo-noise (PN) sequence generator.

17. The system of claim 11, wherein the sequence determination component employs a starting interlace offset based on a communication system parameter to facilitate in determining at least one of the first interlace starting position or the second interlace starting position.

18. The system of claim 17, wherein the communication system parameter comprises a network identification (ID).

19. A multimedia communication system that employs the system of claim 11.

20. An OFDM-based communication system that employs the system of claim 11 to eliminate pilot carrier signal interference limitations.

21. A microprocessor that executes instructions for performing a method of facilitating wireless data communications using OFDM, comprising:
receiving an initial pilot group staggering sequence, the initial pilot group staggering sequence including two or more interlaces beginning with an initial starting interlace number, wherein the initial pilot group staggering sequence staggers as a function of time;
determining a first interlace starting position for a first network, the first interlace starting position indicating a first interlace position in the initial pilot sequence;

determining a first starting interlace number for the first network based on the initial pilot group staggering sequence and the first interlace starting position, wherein the first starting interlace number is the respective interlace in the initial pilot group staggering sequence located in the first interlace position indicated by the first interlace starting position;

re-ordering the initial pilot group staggering sequence a first time to generate a first pilot staggering sequence to apply to the first network, the first pilot staggering sequence beginning with the first starting interlace number;

determining a second interlace starting position for a second network, the second interlace starting position indicating a second interlace position in the initial pilot sequence;

determining a second starting interlace number for the second network based on the initial pilot group staggering sequence and the second interlace starting position, wherein the second starting interlace number is the respective interlace in the initial pilot group staggering sequence located in the second interlace position indicated by the second interlace starting position; and re-ordering the initial pilot group staggering sequence a second time to generate a second pilot staggering sequence to apply to the second network to mitigate collisions of a first pilot signal applied in the first network and a second pilot signal in the second network, the second pilot staggering sequence beginning with the second starting interlace number.

22. The method of claim 21, further comprising:
utilizing the first pilot staggering sequence in a first symbol of a frame of a communication signal.

23. The method of claim 21, further comprising:
employing at least one communication system parameter to facilitate in determining at least one of the first or the second interlace starting number.

24. The method of claim 23, wherein the communication system parameter comprises at least one network identification (ID).

25. The method of claim 21, wherein determining at least one of the first interlace starting position or the second interlace starting position further comprises:
employing a random number generator to select at least one of the first interlace position or the second interlace position from the interlaces of the initial pilot group staggering sequence.

26. The method of claim 25, wherein the random number generator comprises a pseudo-noise (PN) sequence generator.

27. The method of claim 26, further comprising:
utilizing at least one network identification (ID) to seed the pseudo-noise (PN) sequence generator.

28. The method of claim 25, wherein determining at least one of the first interlace starting position or the second interlace starting position further comprises:
utilizing a starting interlace offset based on a communication system parameter.

29. A method for facilitating wireless data communication using OFDM over at least two networks, comprising:
obtaining an initial pilot subcarrier frequency group staggering sequence, the initial pilot subcarrier frequency group staggering sequence including two or more interlaces beginning with an initial starting interlace number, wherein the pilot subcarrier frequency staggering sequence staggers as a function of time;

determining a first starting interlace number based, at least in part, on the initial pilot subcarrier frequency group staggering sequence;

re-ordering the initial pilot subcarrier frequency staggering sequence a first time to generate a first pilot staggering sequence to apply to a first network, the first pilot staggering sequence beginning with the first starting interlace number;

determining a second starting interlace number based, at least in part, on the initial pilot subcarrier frequency group staggering sequence, the second starting interlace number being different from the first starting interlace number;

re-ordering the initial pilot subcarrier frequency group staggering sequence a second time to generate a second pilot staggering sequence to apply to a second network to mitigate collisions of a first pilot signal applied in the first network and a second pilot signal in the second network, the second pilot staggering sequence beginning with the second starting interlace number;

wherein determining at least one of the first starting interlace number or the second starting interlace number comprises employing a random number generator to select a pilot interlace starting number from the interlaces of the initial pilot subcarrier frequency group staggering sequence;

wherein the random number generator comprises a pseudo-noise (PN) sequence generator; and utilizing at least one network identification (ID) to seed the pseudo-noise (PN) sequence generator.

30. A system that facilitates wireless data communication over at least two networks using OFDM, comprising:
a receiving component that receives an initial pilot subcarrier frequency group staggering sequence, the initial pilot subcarrier frequency group staggering sequence including two or more interlaces beginning with an initial starting interlace number, wherein the pilot staggering sequence staggers as a function of time;

at least one starting interlace number determining component that determines a first starting interlace number and a second starting interlace number based, at least in part, on the initial pilot subcarrier frequency group staggering sequence, wherein the second starting interlace number is different from the first starting interlace number;

at least one sequence determination component that re-orders the initial pilot subcarrier frequency group staggering sequence a first time to generate a first pilot staggering sequence to apply to a first network, and re-orders the initial pilot subcarrier frequency group staggering sequence a second time to generate a second pilot staggering sequence to apply to a second network so as to decrease probability of a collision of a first pilot signal applied in the first network and a second pilot signal applied in the second network;

wherein the sequence determination component utilizes a random number generator to facilitate in deriving at least one of the first or the second starting interlace number;

wherein the random number generator comprises a pseudo-noise (PN) sequence generator; and wherein the sequence determination component utilizes at least one network identification (ID) to seed the pseudo-noise (PN) sequence generator.

31. A microprocessor that executes instructions for performing a method of facilitating wireless data communications using OFDM, comprising:
obtaining an initial pilot subcarrier frequency group staggering sequence, the initial pilot subcarrier frequency group staggering sequence including two or more interlaces beginning with an initial starting interlace number, wherein the pilot subcarrier frequency staggering sequence staggers as a function of time;

determining a first starting interlace number based, at least in part, on the initial pilot subcarrier frequency group staggering sequence;

re-ordering the initial pilot subcarrier frequency staggering sequence a first time to generate a first pilot staggering sequence to apply to a first network, the first pilot staggering sequence beginning with the first starting interlace number;

determining a second starting interlace number based, at least in part, on the initial pilot subcarrier frequency group staggering sequence, the second starting interlace number being different from the first starting interlace number;

re-ordering the initial pilot subcarrier frequency group staggering sequence a second time to generate a second pilot staggering sequence to apply to a second network to mitigate collisions of a first pilot signal applied in the first network and a second pilot signal in the second network, the second pilot staggering sequence beginning with the second starting interlace number;

wherein determining at least one of the first starting interlace number or the second starting interlace number comprises employing a random number generator to select a pilot interlace starting number from the interlaces of the initial pilot subcarrier frequency group staggering sequence;

wherein the random number generator comprising a pseudo-noise (PN) sequence generator; and utilizing at least one network identification (ID) to seed the pseudo-noise (PN) sequence generator.

* * * * *